United States Patent [19]

Arbir

[11] 4,130,434
[45] Dec. 19, 1978

[54] PAINT COMPOSITIONS
[75] Inventor: Francis W. Arbir, Itasca, Ill.
[73] Assignee: Abbott Laboratories, North Chicago, Ill.
[21] Appl. No.: 853,594
[22] Filed: Nov. 21, 1977

Related U.S. Application Data

[63] Continuation-in-part of Ser. No. 763,390, Jan. 28, 1977, which is a continuation-in-part of Ser. No. 728,338, Sep. 30, 1976, abandoned.

[51] Int. Cl.$^2$ ............................................. C09D 5/14
[52] U.S. Cl. ...................... 106/15 R; 260/29.6 MQ; 260/29.6 MM; 424/291; 424/337
[58] Field of Search ............. 106/15 R; 424/291, 337

[56] References Cited

U.S. PATENT DOCUMENTS

| 3,579,553 | 5/1971 | Leebrick | 424/291 |
| 3,615,745 | 10/1971 | Crovetti et al. | 424/337 |
| 3,801,332 | 4/1974 | Cadmus | 424/291 |

*Primary Examiner*—Lorenzo B. Hayes
*Attorney, Agent, or Firm*—Paul D. Burgauer; Robert L. Niblack

[57] ABSTRACT

Paint compositions containing an industrial biocide can be prevented from yellowing by the addition of a small amount of a certain mercury salt.

6 Claims, No Drawings

PAINT COMPOSITIONS

HISTORY OF THE INVENTION

This is a continuation-in-part of my previously filed application Ser. No. 763,390, filed on Jan. 28, 1977, which is a continuation-in-part of Ser. No. 728,338, filed on Sept. 30, 1976 which has been abandoned.

DETAILED DESCRIPTION OF THE INVENTION

Certain biocides have proven useful in various paint formulations, such as exterior latex house paints. However, in certain paint formulations, particularly alkyd-modified acrylics, straight acrylics and vinyl acrylic copolymers, some commercially available paint biocides react with certain components in the paint formulation causing a transient yellowing on surfaces painted with white paint. The transient yellowing last up to 72 hours and is totally unacceptable in the paint industry. The present invention provides a method for overcoming the undesirable problem by incorporating a phenylmercury salt into the paint formulation containing specified biocides.

In recent years, a new series of biocides have been developed and found use in many industrial applications. They are the diiodomethylsulfones, carrying alkyl, aryl, aralkyl, haloalkyl, nitroalkyl, nitrophenyl, halophenyl and halonitrophenyl substituents on the sulfone moiety. While these biocides are highly effective in many industrial environments, they were acceptable in the paint industry only to the extent of dark paints, because they develop a transient yellowing on white and other light-colored paints. Although this color disappears after 2 or 3 days, the yellowing effect is totally unacceptable for exterior paints. Since biocides are primarily used in exterior paints, the temporary discoloring effect caused by them essentially removed the above biocides from use in paints.

It has now been found that a paint composition containing a diiodomethyl sulfone (DIS) biocide of the formula $R-SO_2CHI_2$ wherein R is phenyl, alkylphenyl, dialkylphenyl, benzyl, chlorobenzyl, dichlorobenzyl, or an alkyl group of 2–8 carbon atoms, hereinafter referred to as R-DIS is substantially completely prevented from yellowing by the addition of an acyloxy phenylmercury salt in an amount from 25 to 500% of the amount of said biocide. The term "acyloxy phenylmercury salt" is intended to include those PM salts which are derived from organic mono- or dicarboxylic acids which may include a double bond in those instances where a carbon chain of more than 10 carbon atoms is involved. Typical representatives are phenylmercury acetate, phenylmercury oleate, di-(phenylmercury) dodecenyl succinate and other salts of this general nature. These salts can be expressed by the formula $R'-COOHgC_6H_5$ or $R''-(COOHgC_6H_5)_2$ wherein $R'$ is an alkyl chain of 1–19 and $R''$ is an alkylene chain of 2–18 carbon atoms, preferably containing no more than one double-bond. These PM salts are effective in preventing yellowing whether the above DIS is used alone or together with a diluent as it is customary to dilute biocides of this type with 25–100% of a biologically inert material. Often, such a diluent consists of butylated hydroxytoluenes, hereinafter referred to as BHT.

In a general embodiment of the present invention, a paint composition is made up according to known and well accepted formulations except that, as the biocide, between 1 and 5 pounds of the above biocide per 100 gallon of paint formulation and an amount equal to 25-500% of said biocide amount of the above acyloxy phenylmercury salt are added. Such a paint formulation is stable to normal storage for extended periods of time and upon use thereof for coating outside surfaces, substantially no yellowing effect can be detected.

In order to illustrate the improvement attained by the present invention, reference is made to the following examples which, however, are not intended to limit the invention in any respect.

EXAMPLE 1

White paint formulations were made up with the following ingredients:

| | | |
|---|---|---|
| Water | 175 | lbs. |
| Anionic surfactant | 10.5 | " |
| Non-ionic surfactant | 2.5 | " |
| Dispersing Agent | 1.5 | " |
| Defoamers | 3.0 | " |
| Ethylene glycol | 25.0 | " |
| Hydroxyethylcellulose | 2.1 | " |
| Titanium dioxide | 237.5 | " |
| Magnesium silicate | 191.4 | " |

These ingredients, together with the biocides listed below, were dispersed for 20 minutes at high speed and then combined with a mixture of

| | | |
|---|---|---|
| Acrylic emulsion | 490.8 | lbs. |
| Tributyl phosphate | 5.0 | " |
| Defoamer | 1.0 | " |
| Ammonia | 2.0 | " |

Ten separate formulations were made up containing the biocide combinations a) to e) shown below. Five of these were taken from the above paint mixture (A); the other five contained the same mixture except for using a different acrylic emulsion (B). All listed ingredients were selected from those used in standard commerical paint formulations.

| | | |
|---|---|---|
| a) | 4 lbs. R-DIS/BHT 4:1 | |
| b) | 4 lbs. R-DIS/BHT 4:1 + 1.0 lb | $CH_3COOH_gC_6H_5$ |
| c) | 4 lbs. R-DIS/BHT 4:1 + 2.0 lbs. | " |
| d) | 4 lbs. R-DIS/BHT 4:1 + 3.0 lbs. | " |
| e) | No additive | |

R = p-tolyl

Three-mil drawdowns of the ten coatings were prepared, using a 3-mil bird blade on scaled charts. The charts were then placed under UV sunlamps and the yellowing index of the films was determined instrumentally, using a Hunter Color Difference meter after exposures of 24, 48, 72, 96 and 168 hrs. The yellowing index numbers are shown in Table I (higher number indicates increased yellowness).

TABLE I

| Paint-Biocide | 24 hrs. | 48 hrs. | 72 hrs. | 96 hrs. | 168 hrs. |
|---|---|---|---|---|---|
| A - a | 13.0 | 16.1 | 19.0 | 19.8 | 20.3 |
| A - b | 2.1 | 7.0 | 10.4 | 13.9 | 18.7 |
| A - c | 1.0 | 1.3 | 1.7 | 5.0 | 13.2 |
| A - d | 1.0 | 1.3 | 1.3 | 2.1 | 3.2 |
| A - e | 0.7 | 1.0 | 1.0 | 1.0 | 1.2 |
| B - a | 6.3 | 7.5 | 8.3 | 9.6 | 10.3 |
| B - b | 1.1 | 1.7 | 1.9 | 2.0 | 2.6 |
| B - c | 1.0 | 1.5 | 1.5 | 1.5 | 1.4 |
| B - d | 0.9 | 1.3 | 1.3 | 1.4 | 1.4 |
| B - e | 1.0 | 1.4 | 1.6 | 1.6 | 1.2 |

EXAMPLE 2

The above ten formulations were also applied to panels of white pine by brushing them on in two coats at a spreading rate of 400 ft$^2$/gal. These panels were then exposed to direct sunlight for 10 days and the yellowness index was recorded by the apparatus of Example 1 at periodic intervals as shown in Table II.

TABLE II

| Paint-Biocide | 8 hrs. | 16 hrs. | 24 hrs. | 54 hrs. | 102 hrs. | 200 hrs. | 240 hrs. |
|---|---|---|---|---|---|---|---|
| A - a | 10.3 | 11.1 | 11.4 | 4.0 | 3.9 | 5.7 | 5.9 |
| A - b | 2.2 | 5.3 | 6.0 | 2.9 | 4.0 | 5.3 | 4.4 |
| A - c | 1.8 | 2.5 | 2.8 | 2.0 | 3.9 | 4.1 | 3.6 |
| A - d | 2.1 | 3.2 | 2.5 | 1.8 | 4.0 | 4.2 | 4.3 |
| A - e | 1.6 | 2.6 | 2.2 | 1.5 | 3.5 | 3.7 | 3.6 |
| B - a | 3.1 | 5.5 | 6.4 | 3.3 | 4.5 | 5.7 | 5.1 |
| B - b | 1.7 | 3.0 | 3.2 | 2.5 | 4.6 | 4.8 | 4.0 |
| B - c | 2.2 | 2.9 | 3.1 | 1.9 | 4.5 | 4.5 | 3.9 |
| B - d | 2.0 | 2.9 | 2.9 | 1.8 | 4.7 | 4.4 | 3.9 |
| B - e | 2.1 | 3.4 | 3.2 | 1.8 | 4.6 | 4.6 | 4.1 |

EXAMPLE 3

Another paint formulation was prepared from the following ingredients:

| | | |
|---|---|---|
| Water | 250 | lbs. |
| Anionic surfactant | 8.0 | " |
| Non-ionic surfactant | 2.5 | " |
| Dispersing agent | 1.0 | " |
| Hydroxyethylcellulose | 2.5 | " |
| Ethylene glycol | 25.0 | " |
| 2-Ethoxyethanol acetate | 15.0 | " |
| Defoamers | 3.0 | " |
| Titanium dioxide | 250.0 | " |
| Magnesium silicate | 200.0 | " |
| Biocides as shown below | | |

After mixing these components at high speed for 20 minutes, 400 lbs. of vinyl acrylic emulsion containing 1.0 lb. of a defoamer were blended with the above. The vinylacrylic paint so obtained was tested as shown in Example 2. The yellowing index results are given in Table III, using the same biocide mixtures a) to e) shown in Example 1.

TABLE III

| Biocide | 8 hrs. | 24 hrs. | 48 hrs. | 96 hrs. | 200 hrs. |
|---|---|---|---|---|---|
| a | 1.8 | 5.2 | 5.3 | 6.8 | 7.7 |
| b | 1.2 | 2.5 | 3.8 | 4.7 | 3.7 |
| c | 1.6 | 3.0 | 4.6 | 4.8 | 4.2 |
| d | 1.5 | 2.8 | 3.9 | 3.9 | 3.8 |
| e | 1.3 | 2.9 | 4.1 | 4.0 | 3.8 |

By replacing the above 80% R-DIS/BHT mixture with a 50% mixture or pure 4-tolyl diiodomethyl sulfone in the above formulations, results substantially indentical to those in Table III are obtained.

EXAMPLES 4-27

A paint base was made up by a 20 minute high-speed dispersion of

| | | |
|---|---|---|
| Water | 215.9 | lbs. |
| Anionic surfactant | 10.5 | " |
| Non-ionic surfactant | 2.5 | " |
| Dispersing agent | 1.5 | " |
| Defoamers | 3.0 | " |
| Ethylene glycol | 25.0 | " |
| Hydroxyethylcellulose | 2.3 | " |
| Titanium dioxide | 237.5 | " |
| Magnesium silicate | 237.5 | " |
| Biocide mixture as listed | | |

This dispersion was blended with a mixture of

| | | |
|---|---|---|
| Acrylic emulsion | 390.8 | lbs. |
| Long oil alkyd | 30.8 | " |
| Cobalt drier | 0.2 | " |
| Zirconium drier | 0.6 | " |
| Defoamer | 1.0 | " |
| Tributylphosphate | 9.3 | " |
| Ammonia | 1.0 | " |

The results obtained with this latex house paint containing phenylmercury acetate (PMA) or di-(phenylmercury) dodecenyl succinate (PMDS) according to the tests in Example 1 (A) and Example 2 (B) are shown in Table IV. In all instances, the DIS of Example 1 was used as a mixture with butylated hydroxytoluene containing 80% by weight of DIS. Those skilled in the interpretation of color index differentiating measuring devices such as the above will recognize that the yellowing rates of 1 and 3 would not be distinguishable by the human eye. Thus, a reading of about 3 is still acceptable in a white paint.

Table IV also contains a mold rating (MR) column which shows, on a scale from 0 (no mold) to 4 the performance of the paint in a mold box test. In this test, the above paints were applied to tongue depressors by dipping the latter in the paint, drying them, inoculating them with a mixture of *A.pullulans*, *P.funiculosum* and *A.niger* and placing them in mold boxes for four weeks at 32° C. and a relative humidity of 90-100%. The MR-readings given below are those obtained after 4 weeks.

TABLE IV

| Ex. # | Additives in lbs. per 100 gal. paint | Test A 24 | Test A 96 | Test B 8 | Test B 54 | Test B 240 hrs | MR |
|---|---|---|---|---|---|---|---|
| 4 | 9 PMA | 2.4 | 3.0 | 0.7 | 1.6 | 3.1 | 2 |
| 5 | 5 " | 2.4 | 2.8 | 1.2 | 1.8 | 3.8 | 3 |
| 6 | 1 " | 2.3 | 2.7 | 1.2 | 1.5 | 3.7 | 4 |
| 7 | 7 " + 1 DIS | 1.5 | 2.0 | 1.0 | 1.5 | 3.7 | 1 |
| 8 | 5 " + 1 " | 1.9 | 3.0 | 1.0 | 1.4 | 3.9 | 1 |
| 9 | 3 " + 1 " | 1.3 | 1.9 | 1.2 | 1.5 | 3.4 | 0 |
| 10 | 1 " + 1 " | 1.3 | 2.1 | 1.4 | 1.6 | 3.9 | 1 |
| 11 | 7 " + 2 " | 1.3 | 2.3 | 1.4 | 1.8 | 5.0 | 0 |
| 12 | 5 " + 2 " | 1.2 | 2.2 | 1.1 | 1.7 | 4.4 | 0 |
| 13 | 3 " + 2 " | 1.1 | 2.5 | 1.9 | 1.8 | 4.4 | 0 |
| 14 | 1 " + 2 " | 1.2 | 3.0 | 1.5 | 1.8 | 4.4 | 0 |
| 15 | 9 FMDS | 1.4 | 2.1 | 1.6 | 2.2 | 3.4 | 1 |
| 16 | 5 " | 1.5 | 2.1 | 1.7 | 2.0 | 3.4 | 3 |
| 17 | 1 " | 1.4 | 1.9 | 1.7 | 1.8 | 3.9 | 4 |
| 18 | 7 " + 1 DIS | 1.4 | 2.0 | 1.7 | 1.7 | 3.6 | 0 |
| 19 | 5 " + 1 " | 1.2 | 2.0 | 2.1 | 2.0 | 4.1 | 0 |
| 20 | 3 " + 1 " | 1.1 | 2.1 | 1.6 | 1.7 | 3.6 | 0 |
| 21 | 1 " + 1 " | 1.6 | 3.0 | 1.8 | 1.9 | 3.8 | 0 |
| 22 | 7 " + 2 " | 1.4 | 2.6 | 1.9 | 1.7 | 3.9 | 1 |
| 23 | 5 " + 2 " | 1.5 | 4.3 | 1.4 | 1.7 | 3.5 | 0 |
| 24 | 3 " + 2 " | 1.0 | 4.9 | 1.7 | 1.9 | 4.1 | 0 |
| 25 | 1 " + 2 " | 1.4 | 4.9 | 1.8 | 2.2 | 4.3 | 0 |
| 26 | 2 DIS | 7.8 | 9.6 | 5.7 | 2.5 | 4.6 | 0 |
| 27 | none | 1.7 | 2.2 | 2.4 | 2.5 | 3.4 | 4 |

The above examples clearly show that a house paint containing no biocide deteriorates rapidly when exposed to common molds and that it therefore requires biocidal protection. As shown, a DIS alone provides excellent protection, but it is unacceptable from the discoloration standpoint. However, a combination of a DIS with a phenylmercury salt of an organic mono- or dicarboxylic acid protects the paint against fungal growth and against discoloration by sun light or UV light.

EXAMPLES 28-32

The above examples all demonstrate the use of a specific DIS, namely the 4-tolyl diiodomethyl sulfone. In the following table, yellowing results are shown with paint formulation drawdowns containing a DIS other than the above. In all instances, the paint formulation and preparation of Example 1 is used. Substituent R shown in Table V refers to R of the above R-DIS, and the measured yellowing index (YI). In each example, the paint contains 4 lbs. of a DIS with (b) or without (a) and 3 lbs. of phenyl mercury acetate per 100 gallons of paint.

TABLE V

|    | R | | YI after 24 hrs. | YI after 48 hrs. |
|----|---|---|------------------|------------------|
| 28 | ethyl | a | 16.9 | 21.9 |
|    | " | b | 0.6 | 1.5 |
| 29 | hexyl | a | 17.6 | 23.4 |
|    | " | b | 0.8 | 2.0 |
| 30 | octyl | a | 17.7 | 21.6 |
|    | " | b | 0.8 | 1.6 |
| 31 | Cl-C$_6$H$_3$(Cl)-CH$_2$- | a | 13.2 | 15.9 |
|    |  | b | 0.8 | 0.9 |
| 32 | C$_6$H$_5$-CH$_2$- | a | 13.2 | 15.9 |
|    |  | b | 0.8 | 0.9 |

EXAMPLE 33

While the above examples use the R-DIS as an 80% mixure with BHT, the same results are obtained when substantially pure R-DIS is used:

The paint formulation of Example 1, emulsion B, is prepared as stated, but containing 4 pounds of tolyl-DIS and 3 pounds of phenylmercury acetate per 100 gallons of paint. This paint, with and without said mercury salt, was tested exactly as shown in Example 1, resulting in a yellowing index reading of 1.6 for the sample containing biocide and mercury salt and 4.8 for the sample containing the biocide alone, after 48 hours under UV light.

While the above examples demonstrate the effects with only two particular phenylmercury salts, other acyloxy phenylmercury salts of diacyloxy diphenylmercury salts produce substantially similar results. These salts have been used before by the paint industry and are well known and easily synthesized. However, their use to prevent the temporary yellowing caused by the use of a DIS as the biocide was a surprising and unexpected discovery.

Paint compositions containing a DIS and the above mercurial salt are substantially completely protected against biological or light degradation. The preferred range for a DIS is between 2 and 4 lbs. per 100 gallons of paint with 2 to 5 lbs. per 100 gallons of said phenylmercury salt. While ordinarily, 5 lbs. of a DIS is the practical upper limit in 100 gallons of paint, larger amounts can sometimes be usefully employed, although amounts of >10 lbs/100 gallons serve no additional purpose.

Mercury salt amounts of .25% of the amount of the biocide is about the lowest level that will prevent yellowing caused by the biocide. Amounts up to 5 times the amount of the biocide can be used but on a weight basis, it would be unnecessary to exceed 10 lbs/100 gallons of paint. In some paint systems, particularly those used for interior paints in dry climates, 1 lb/100 gal. of the biocide produces sufficient protection against biological deterioration of the paint or its substrate and 0.25 lb/100 gal. of the acyloxy phenylmercury compound would be sufficient to overcome the temporary yellowing effect that might occur with this low level of a DIS. On the other hand, in paints designed for exterior use in humid climates, 5 lbs. of a DIS and 10 lbs. of the phenylmercury salt produce substantially full protection against biological and light deterioration or degradation. Larger amounts of either additive could be used but provide no significant benefit over the named amounts.

Aside from the mercury salts exemplified above, phenylmercury oleate provides the same excellent results as demonstrated in the examples. However, other acyloxy phenylmercury salts can be used in the same fashion, i.e. the phenylmercury propionate, hexanoate, decanoate, palmitate, stearate, or the di(phenylmercury)maleate, malonate, succinate which may carry alkyl substituents in the alkylene chain between the carboxy groups.

What is claimed is:

1. The process of preventing or reducing yellowing in paint compositions containing a biocide of the formula R-SO$_2$-CHI$_2$ wherein R is phenyl, alkylphenyl, benzyl, chlorobenzyl, dichlorobenzyl or an alkyl group of 2-8 carbons consisting essentially in adding to said paint composition between 0.25 and 5.0 lbs. per pound of said biocide of a phenylmercury acylate consisting essentially of a compound having the formula R'-COOHgC$_6$H$_5$ or R''-(COOHgC$_6$H$_5$)$_2$, wherein R is an alkyl group of 1-19 carbon atoms and R'' is an alkylene group of 2-18 carbon atoms, said alkyl or alkylene containing between 0 and 1 double bond.

2. The process of claim 1 wherein said phenylmercury acylate is phenylmercury acetate.

3. The process of claim 1 wherein said phenylmercury acylate is di(phenylmercury)dodecenyl succinate.

4. The process of claim 1 wherein said phenylmercury acylate is added in an amount of from 0.25 to 10 lbs. per 100 gallons of paint.

5. The process of claim 4 wherein said phenylmercury acylate is phenylmercury acetate.

6. The process of claim 4 wherein said phenylmercury acylate is di(phenylmercury)dodecenyl succinate.